Figures 1, 2:
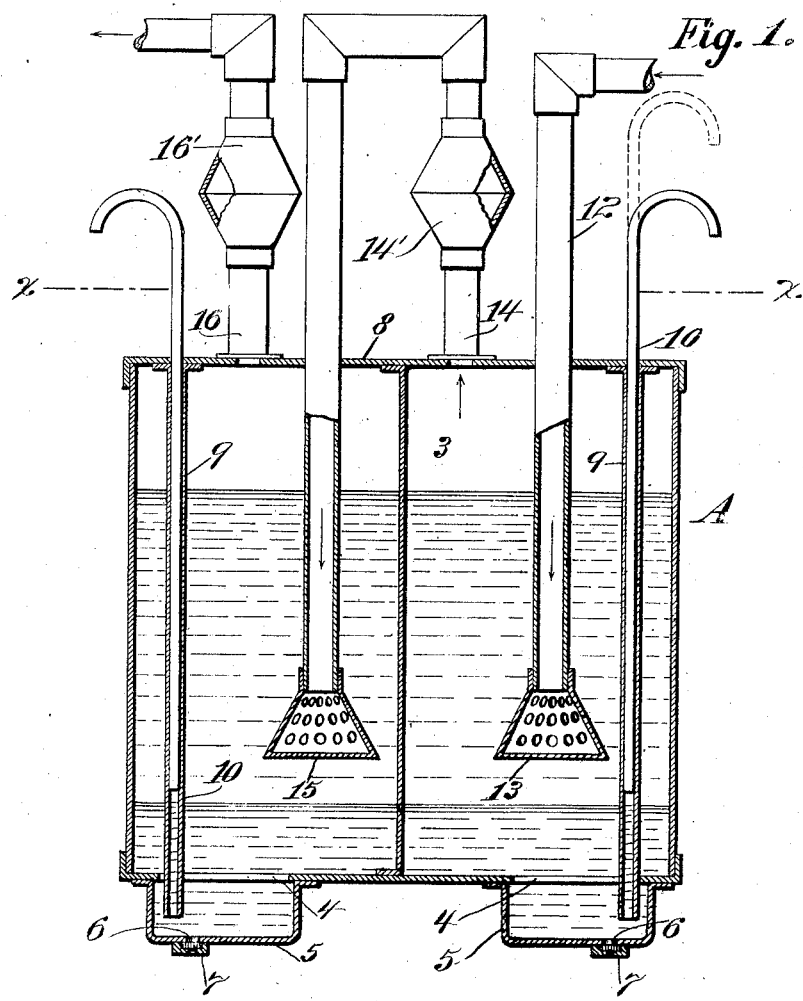

No. 850,680. PATENTED APR. 16, 1907.
G. G. SMITH.
PROCESS OF PURIFYING GAS.
APPLICATION FILED DEC. 12, 1901.

Witnesses:
Frederick G. Hachenburg
Fred. E. Maynard.

Inventor:
George Gregory Smith.
By his Attorney,
F. H. Richards.

UNITED STATES PATENT OFFICE.

GEORGE GREGORY SMITH, OF FLORENCE, ITALY.

PROCESS OF PURIFYING GAS.

No. 850,680.     Specification of Letters Patent.     Patented April 16, 1907.

Original application filed December 17, 1900, Serial No. 40,127. Divided and this application filed December 12, 1901. Serial No. 85,545.

*To all whom it may concern:*

Be it known that I, GEORGE GREGORY SMITH, a citizen of the United States, residing in Florence, Italy, have invented certain new and useful Improvements in Processes of Purifying Gas, of which the following is a specification.

This invention relates to the process of purifying gas, and has for its object to provide a system of removing from acetylene and other gases the moisture and impurities carried thereby.

Another object of the invention is the purification of gas and passing the gas from the purifier in a clean, dry, and uninterrupted manner.

Another object of the invention is the purifying of gas and the automatical purging of the purifier of the impurities removed from the gas.

In carrying out my invention I pass the gas through a closed chamber containing a liquid of greater specific gravity than the gas and of less specific gravity than the moisture and impurities carried by the gas. A suitable oil may be employed, and a liquid which has no affinity for the gas which is being purified will produce good results. For the sake of economy a liquid may be used which has no chemical affinity for the impurities carried by the gas.

I have found that liquid vaseline upon gas passing through the same will remove from the gas by condensation and precipitation all moisture carried by the gas. The gas in its passage through the vaseline forms an emulsion therewith, and upon the separation of the gas from the emulsion all moisture which has been condensed will be precipitated and the vaseline saturated with the impurities which it has removed from the gas. Upon supersaturation of the vaseline the water precipitated will carry with it the excess of saturation. The more rapidly the gas is passed through the vaseline or other depurant the more efficiently will it act upon the gas and a more intimate emulsion will, although not more lasting, be formed.

The water and impurities precipitated may be drawn off from time to time by petcocks or other means, or a column of liquid contained in a tube may be utilized for balancing the normal height and pressure of the liquid in the depurator-chamber, and upon the precipitation and accumulation of a height of matter at the bottom or below the vaseline the pressure exerted by the gas upon the surface of the vaseline will overbalance the column of liquid and press out sufficient of the water and accumulation at the bottom of the depurator to restore the balance. The length of the column of liquid may be regulated to regulate the apparatus to fill the various requirements of the positions in which it is to be utilized.

Upon the rapid passage of the gas through the depurant and its rising therefrom and leaving the depurator-chamber by means of a pipe bubbles or viscous film will be carried by the gas into the pipe. The removal and breaking of such bubbles or viscous film has been a problem which has impeded the successful carrying out of the process of purifying gas. By expanding such bubbles or viscous film to the point where they will break and so breaking them the gas will be permitted to travel through the pipes unimpededly and will not carry with it such bubbles or viscous film, which if permitted to flow in with the gas will find lodgment in the depressed portions of the gas-pipes and form traps.

Apparatus which is capable of utilization in the carrying out of this process is shown and described in my application for United States Letters Patent, Serial No. 40,127, filed December 17, 1900, for depurators for acetylene and other gas and of which application the present is a division.

For the purpose of illustrating the description of the carrying out of my process practically reference is had to the accompanying drawings, wherein—

Figure 1 shows a vertical sectional view of a form of apparatus which may be employed. Fig. 2 is a top view thereof.

Depurator-chambers (designated in a general way by A) are each shown as comprising a closed chamber 3, provided at its bottom or lower portion with an opening 4, communicating with a well 5, having in its lower portion an outlet 6, covered by a screw-cap 7, secured to the lower side of the top plate 8 of the chamber, and surrounding hole therein is shown a pipe 9, projecting through the opening 4 and into the well. Located within the pipe is shown a pipe 10, which may slide freely up and down telescopically within the pipe, which pipe is shown as having a curved or bent-over upper end.

Entering one of the tanks is shown a feedpipe or supply-pipe 12, provided with a rose 13 at its lower end, which rose is toward the bottom of the tank. Leading from the top of this tank is a pipe 14, which enters the next compartment and is similarly provided at its lower end with a rose 15, and leading from the second chamber is a pipe 16, which may lead to another depurator-chamber or may lead off to some storing or distributing device. The pipes 14 and 16 are shown as provided at a short distance above the inlet portions thereof with enlargements 14′ 16′, respectively, which in the present instance are in the form of truncated cones set base to base.

In carrying out my process with an apparatus similar to the one shown in the drawings each chamber would be nearly filled with liquid vaseline, if liquid vaseline is the depurating agent which will be employed, and the gas admitted to the chamber through the pipe 12, which will carry the gas down below the surface of the vaseline or other depurant and pass it through the depurant in finely-divided streams, causing the gas and vaseline to mix more or less intimately. The gas will rise from the emulsion, and the moisture carried by the gas will be condensed, and such water of condensation will be precipitated and will carry with it impurities separated from the gas by the depurant. The water and impurities being heavier than the depurant will sink to the bottom of the chamber into the well. If the flow of gas is continuous, the pressure into the top thereof will force the same through the flue and telescopic tube, which tube will have been regulated to meet a predetermined amount of pressure, the dotted lines x indicating a height to which the column might be raised for balancing the apparatus. Upon the pressure within the chamber exceeding the hydrostatic balance of the column of liquid within the tube the liquid will be forced out of the tube. The tubes are shown with bent open ends, so that the liquid may be carried away or caught by some convenient means.

If the generation of gas is spasmodic or occurs at intervals, the precipitate from each passage of gas will be thrown out from the chamber upon the subsequent generation of gas.

The gas will pass from the first depurator-chamber through the pipe 14 to the next depurator-chamber, and the enlargement therein will expand and break bubbles or viscous film carried by the gas and return the substance of such bubbles or film back to the depurator-chamber. The gas may be passed from the first chamber immediately to the source of utilization, or it may pass on through the pipe 14 into the second chamber, and whatever impurities escape removal in the first chamber are there removed.

For certain purposes it may be desirable to pass the gas from the second depurator into the third or fourth chamber, or it may be desired to pass it on to the point of utilization. The pipe leading from the second chamber will be provided with means whereby the bubbles or viscous film will be expanded and broken.

I have shown for the purpose of explaining my invention a form of apparatus with which the invention may be carried out, yet I do not limit myself to the employment of such apparatus, as it will be apparent that many deviations may be had, the purpose of the drawings being simply for illustration.

Having described my invention, I claim—

1. The process which consists in rapidly passing gas from a generator in small streams through liquid vaseline, thereby throwing down water from the gas and mixing the gas and vaseline to depurate the gas, and removing the water thrown down from beneath the vaseline.

2. The process which consists in passing acetylene gas from a generator through liquid vaseline, thereby throwing down water carried by the gas and collecting the water below such vaseline, automatically ejecting the water therefrom, and then passing the same gas through other liquid vaseline, throwing down water carried by the gas, collecting the water below such vaseline, and automatically ejecting the water.

3. The process which consists in rapidly passing gas from a generator in small streams through liquid vaseline, thereby throwing down water from the gas and mixing the gas and vaseline to depurate the gas, and removing the water thrown down from beneath the vaseline, then passing the same gas in small streams through other liquid vaseline, throwing down water from the gas and mixing the gas and vaseline to further depurate the gas, and removing the water thrown down from below the vaseline.

4. The process which consists in rapidly passing gas in small streams through two or more vessels containing liquid vaseline, thereby throwing down the water from the gas and mixing the gas and vaseline to depurate the gas.

5. The process of depurating acetylene gas, which consists in passing the gas rapidly in small streams through two or more chambers containing liquid vaseline and permitting the gas-bubbles to expand and break in the passages from the respective chambers.

6. The process which consists in rapidly passing gas from a generator in small streams through liquid vaseline, thereby throwing down the water from the gas and mixing the gas and vaseline to depurate the gas, and removing the water from below the vaseline.

7. The process of depurating acetylene gas which consists in passing the gas rapidly in small streams through liquid vaseline, drawing off the gas, and expanding the bubbles or film rising therewith and breaking the bubbles or film.

8. The process of purifying acetylene gas, which consists in passing the gas rapidly into a body of vaseline; then dividing out the impurities from the gas and liberating the gas from the vaseline, precipitating the impurities, and then ejecting the impurities by the pressure of the gas.

9. The process of drying acetylene gas received in a chamber intermittently from the source of generation thereof, which consists in mixing the gas and the moisture carried thereby with vaseline, then condensing and precipitating the moisture, then causing the gas to separate from the vaseline, then leading the gas from the chamber, then expanding the bubbles carried thereby, then breaking the bubbles and returning the vaseline from the bubbles to the chamber, and removing the precipitate from beneath the vaseline.

10. The process of drying acetylene gas in a chamber, which consists in mixing the gas and the moisture carried thereby with liquid vaseline, then condensing and precipitating the moisture, then causing the gas to separate from the vaseline, then leading the gas from the chamber, then expanding the bubbles carried by the gas, then breaking the bubbles and returning the vaseline from the bubbles to the chamber, and removing the precipitate from beneath the vaseline by pressure of the gas.

GEORGE GREGORY SMITH.

Witnesses:
PIERSON L. WELLS,
CHAS. LYON RUSSELL.